United States Patent [19]

Affri

[11] 4,149,828
[45] Apr. 17, 1979

[54] APPARATUS FOR REMOVING DUST FROM AERIFORM SUBSTANCES

[75] Inventor: Ambrogio E. Affri, Varese, Italy

[73] Assignee: Industrie Patente Anstalt, Italy

[21] Appl. No.: 758,581

[22] Filed: Jan. 12, 1977

[30] Foreign Application Priority Data

Jan. 15, 1976 [CH] Switzerland .................. 000545/76

[51] Int. Cl.² .............................................. F04B 23/04
[52] U.S. Cl. .................................. 417/77; 261/116; 417/176; 417/179; 417/196; 417/198
[58] Field of Search ................. 417/76, 77, 176, 179, 417/180, 196, 198; 55/94; 261/116, 118, DIG. 9

[56] References Cited

U.S. PATENT DOCUMENTS

| 118,472 | 8/1871 | Munzinger | 417/77 |
|---|---|---|---|
| 786,234 | 3/1905 | Parson | 417/180 |
| 1,019,548 | 3/1912 | Spitzer | 417/151 |
| 1,151,259 | 8/1915 | Fischer | 417/179 |
| 1,356,674 | 10/1920 | Walker | 417/151 |
| 1,724,641 | 8/1929 | Chanard | 417/176 X |
| 2,090,994 | 8/1937 | Brandes | 261/DIG. 9 |
| 2,786,651 | 3/1957 | Mickle | 417/179 X |
| 3,447,493 | 6/1969 | Taylor et al | 261/DIG. 9 |
| 3,518,812 | 7/1970 | Kolm | 55/94 X |
| 3,659,962 | 5/1972 | Zink et al | 417/179 |
| 3,797,204 | 3/1974 | Cavatassi | 261/116 X |
| 3,929,435 | 12/1975 | Engalitcheff | 261/116 X |
| 3,984,217 | 10/1976 | Huntington | 55/94 X |

FOREIGN PATENT DOCUMENTS

| 1428249 | 12/1968 | Fed. Rep. of Germany | 417/151 |
|---|---|---|---|
| 2546827 | 4/1976 | Fed. Rep. of Germany | 417/196 |

Primary Examiner—John J. Vrablik
Assistant Examiner—Edward Look
Attorney, Agent, or Firm—Gifford, Chandler, VanOphem, Sheridan & Sprinkle

[57] ABSTRACT

The invention provides a jet pump system for removing dust from aeriform substances. The dust-laden, aeriform substance is entrained by at least one water jet pump to cause precipitation of the dust and water as sludge out of the aeriform substance.

5 Claims, 8 Drawing Figures

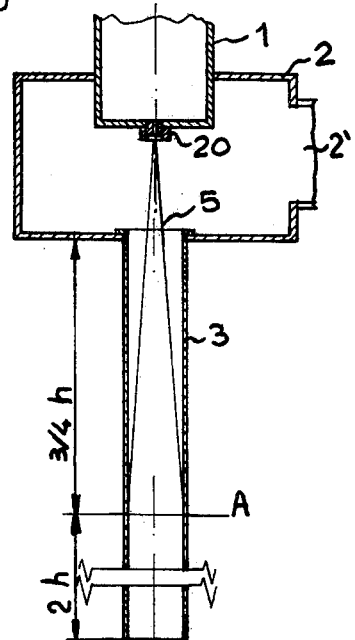
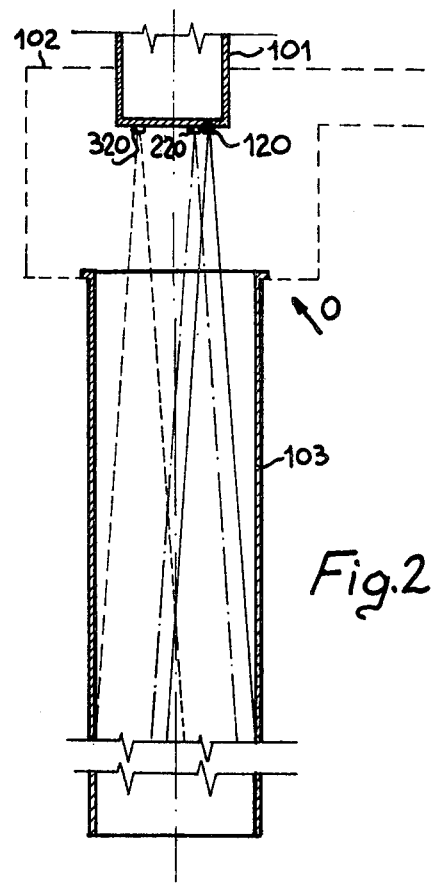
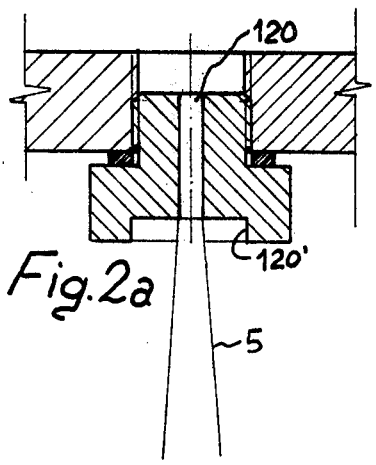
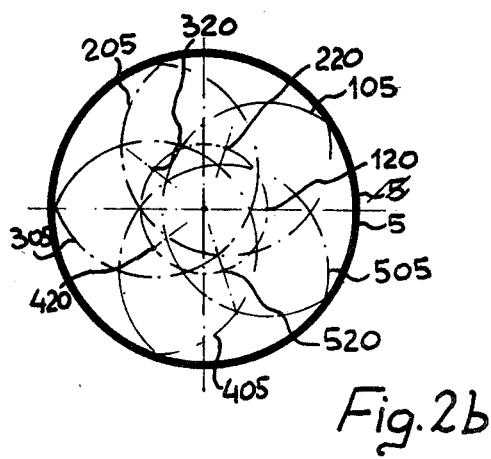

APPARATUS FOR REMOVING DUST FROM AERIFORM SUBSTANCES

BACKGROUND OF THE INVENTION

This invention relates to apparatus for removing dust from seriform substances.

An object of the present invention is to provide apparatus for removing dust from aeriform substances, especially hot air.

With this object in view the present invention provides apparatus for the removal of dust from aeriform substances characterised in that in it the removal of the dust takes place by intimate and total mixing of the aeriform substance laden with dust with water and the spontaneous passage of the dust into the water with liberation of the cleansed aeriform substances. A plant of the present invention comprises at least one water jet pump, an aspirating mouth connecting to the aeriform substance required to have the dust removed therefrom, at least one decantation tank connecting with the pressing mouth of said water jet pump, at least one pump connecting with its respective aspirating mouth to the said decantation tank at a height greater than the sludge/water interface a hydraulic circuit for connecting the pressing mouth of said last pump with the ejectors of the water jet pump, thus re-cycling it in order to make it act again as a propulsive medium for the dusty aeriform substance and to pick up the relative dust, and means for removing from the tank the decanted sludge and dispatching it for disposal or for recovery.

A Bunsenpump is, in the present state of the art, generally used as an instrument for laboratory tests with only small quantities of air. The use of such a pump in industrial plants for pumping quantities of air of the order of a million m³/hour has required specific improvements to be made to the simple and conventional geometrical structure of the pump, especially as the desired action of the pump on the aeriform substance is basically an aspirating action; as for the propelling water, it can consume substantially all the kinetic energy in the intake of the air being collected through fall in the decantation tank. And more than that, this fall is, itself, of aid in the processes of aspiration.

This plant is particularly but not exclusively used for the removal of dust from the hot and powdery airs and gases of cement works, incinerators and the like.

The apparatus can remove nearly all the dust from dustladen airs, and all the dust which is collected in the form of sludge in the decantation tank can be recycled, where, of course, it proves economic to do so; this is precisely the case in cement works where the sludge can be recycled as raw material.

In a cement works plant, dust is a major problem and this dust is found in a variety of locations, for example, the extraction site, the crushing site, the site at which the raw material is ground up, the mixing site, the cooling site, and at the storage site for the raw material. In all these sites apparatus of the type which form the object of the present invention, can be profitably put into use. In the cooling site, the apparatus of the present invention probably constitutes the only dust removal apparatus known at present which can be used at such a site. In fact, at such a site, there are gases at a temperature of about 1300° C. which emerge dusty at a temperature of about 500° C. which are then fed to a discharge chimney.

In the present state of the art, cement works are generally confined to using two types of filters. A first type of filter generally used is one made of textile fibres which, for the purposes of the dust removal, is excellent but which cannot be used at temperatures higher than 300°. A second type of filter generally used is an electrostatic one. Electrostatic filters are relatively costly and their operations are limited by the fact that the gases to be treated may have to be at temperatures and humidities which are conditioned and constant. Hence, the use of such filters and other conventional filters, downstream of the furnace of a cement works at the cooling site is generally impractical. On the other hand, such sites produce a considerable amounts of dust which, when admitted into the atmosphere, may spread for miles and miles causing substantial damage to the environment. If this dust is, however, collected and transformed into sludge by the apparatus of the invention, the dust can be recycled and substantial economies achieved.

The apparatus of the present invention is particularly suitable for such sites not only because it may be indispensable but also because of its simplicity, for its economy of operation and because it brings about a substantially total removal of the dust from the air, allowing the dust to be recycled.

In fact, the apparatus of the present invention effects a substantially total recovery not only of the dust in the air and the operating water used in the apparatus, but also of the very same energy used to pump the water because the water, still in accordance with the present invention, is used to transform the energy to provide an air recycling system which, in any case, would have to be provided by the use of energy in a machine specifically designed for such a purpose.

As a rule, the apparatus performs in a relatively simple manner and this simplicity of operation means that the desired characteristics of the apparatus can be chosen and determined at will by simply assembling together the appropriate number of operating units. The actual operating characteristics of the apparatus can be determined with a wide degree of freedom.

DESCRIPTION OF THE DRAWINGS

The invention will be described further, by way of example, with reference to accompanying drawings in which:

FIG. 1 is a sectional view of a simplified ejector of the apparatus of the present invention;

FIG. 2 is a view similar to FIG. 1 but showing a multiple ejector of the apparatus of the present invention;

FIG. 2a is an enlarged view of the nozzle of FIG. 2;

FIG. 2b is a diagrammatic plan of FIG. 2;

DETAILED DESCRIPTION OF THE PRESENT INVENTION

Figure 3:
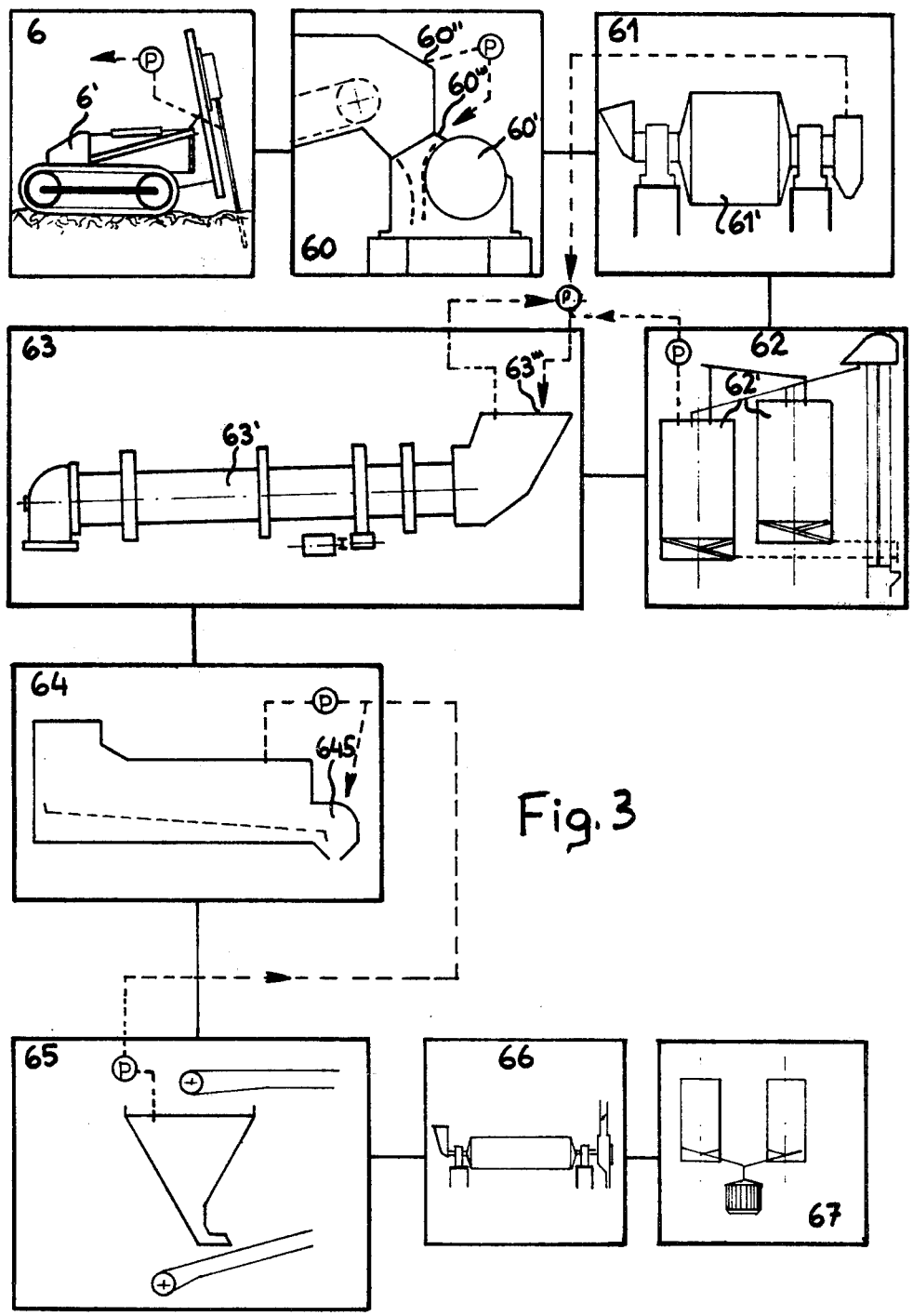
FIG. 3 is a block diagram of a production process for cement in which the particular parts of such a process which product dust have been shown with a diagram of the places in which dust is produced and in which dust removal apparatus according to the present invention could be used.

With reference to FIG. 1 of the drawings, an operating unit of the dust removal apparatus of the invention comprises a water jet pump, of the Bunsen type, having an ejector 1, casing 2 provided with an intake mouth 2′, and with a tube 3 aligned with a nozzle 20 of the ejector 1. The tube 3 also constitutes a pressing tube of the pump of the operating unit. The operating unit shown in FIG. 1 is distinguished from the known water jet pump in that the principle of operation of the water jet pump of the apparatus in question can be different from that of a conventional Bunsen pump. The characteristics of the operating unit, which make it different from the conventional water jet pumps, are suitable for use in dust removal apparatus in that they make it simple and economical to put the apparatus into practical use and increase the performance thereof to the point of transforming an instrument, used conventionally as a laboratory contraption, into an effective operating unit of an industrial plant.

In fact, the ejector 1, in accordance with the present invention, feeds water to a nozzle 20 and the tube 3 opposite thereto, both the nozzle 20 and the tube 3 being perfectly cylindrical. The nozzle 20 and the tube 3 are lacking the necessary constrictions therein which are considered essential to the operation of a water jet pump. In fact, the water jet 5 assumes a substantially frusto-conical shape with an upper base corresponding to the section $A_1$ of outlet of the nozzle which increases in diameter and meets the tube 3 at a distance h from the origin $A_1$, the inside diameter of the tube 3 determining the greater base, section A, of the frustum cone 5.

The increase in section of the water jet 5 implies a variation in specific weight of the fluid in the jet and the air drawn into the jet. For a nozzle 20 of outflow section $A_1$ fed with a fluid of velocity V and mass flowrate q which meets the tube 3 at a distance h from the nozzle 20 and wherein the tube 3 has an internal section A, the frusto-cone 5 with bases S, $A_1$ and height h, and having a volume V, the mean specific weight $Y_c$ of the frusto-cone 5 will be $Y_c = P/V$ where P is the weight of the frusto-cone 5 of volume V. The thrust S provided by such a water jet will be given by $S = V^2/2g$. From tests made, during practical operation of the device, it turns out that the optimum length of the tube 3 is equal to about two and three quarters h, of which about three quarter h is upstream of A and about two h downstream of A. From tests made, starting from these figures there has been found an optimum industrial operating unit which assumes the characteristics represented in FIGS. 2, 2A. 2B of the attached drawings. The operating unit comprises an ejector 101 provided with five nozzles 120, 220, 320, 420, 520, arranged in the manner of vertices of a pentagon equidistant from the axis of the ejector 101. The ejector 101 is applied to the upper wall of the housing body 102, the lower wall of which bears a cylindrical tube 103 of a diameter slightly less than double that which would be necessary for an ejector having a single nozzle. The five nozzles, duly fed with water, form a rose of cone frustums 105, 205, 305, 405, and 505, respectively, the base of said rose of cone frustrums meeting with the internal surface of the tube 103 with a certain amount of mutual intersection or penetration of each jet with its two adjacent jets. Some of the dimensions of an industrial embodiment of the apparatus of the invention will be given here, the operating unit of the apparatus having five nozzles. Each nozzle (see FIG. 2A) has an aperture 120 of diameter 2 mm and a collar 120′ having a diameter of 10 mm. The tube 103 has an inside diameter of 131.7 mm and a length of 140 cm. The axes of the nozzles are arranged on the circumference of a circle of radius 26 mm and the tube 103 is 12 cm distant from the plane of the nozzles.

A cement works will now be briefly described in which there are numerous sites where dust is produced, reference being made to the block diagram of FIG. 3.

At the site 6, where drills 6′, driven with compressed air to actuate, for example, a hammer bit, there is already dust being produced, namely at the site where the mineral is mined: The drills are already provided with a cowl and with a filter and one could replace the filter with apparatus forming the object of the present invention indicated by an arrow and the small ring containing a 'P'. The material thus extracted is, at 60, granulated with granulators 60′ which reduce it to the consistency of nuts. This operation also produces a great deal of dust and, in the present state of the art, remedies of different effectiveness are provided. In accordance with the present invention one could install the apparatus P which picks up the dust from 60″ and re-admits the sludge at 60‴. The granulate prepared from the site 60 passes to a site 61 which is for grinding of the crude mineral ore. There is also a production of cement dust in the machine 61′.

In the present state of the art, any dust from such a site is sent to an electrostatic filter. In accordance with the present invention the dusts emanating from these machines together with those emanated by the furnace, to be described later, can be treated by a single plant P and the sludge extracted can be re-used at 63‴.

Following on the site 61 is the homogeneisation site 62. In this site too there is production of dust on the part of the homogenisers 62′. Here, however, it would not be possible to re-use the sludge at the site itself, hence the sludge would normally have to be discarded. If, however, in the same cement works there is dust removal apparatus according to the invention, the recovery from this site could be linked to the recovery from other sites and used there.

Following on the homogenisation site there is the baking site 63 represented by a rotating furnace 63′. Dust can also be produced which can, however, be conveyed to the same apparatus P which removes the dust from the air at the site 61. As has been said, the sludges produced by this latter plant are joined to the sludges formed by the plant P of the site 62 and, together, they are fed into 63‴.

Following on the baking site is the cooling site 64 which, as has already been said, is precisely the one in which, there being dusty aeriform substances at high temperature, other conventional filters can probably not be used. The apparatus of the invention is most useful at such a site. The next site 65, which is that used for the storage of the raw product also produces dust and, therefore, it is expedient to use the apparatus P. The sludges obtained in this plant can be combined with those from the site 64 at the same point 645.

Following this site are the stations 66 for grinding the cements and the stations 67 for storage and loading; these stations also produce dust but, in this case, the cement having to come near to water, the apparatus is not particularly suited but could be used to great effect.

Figure 4:
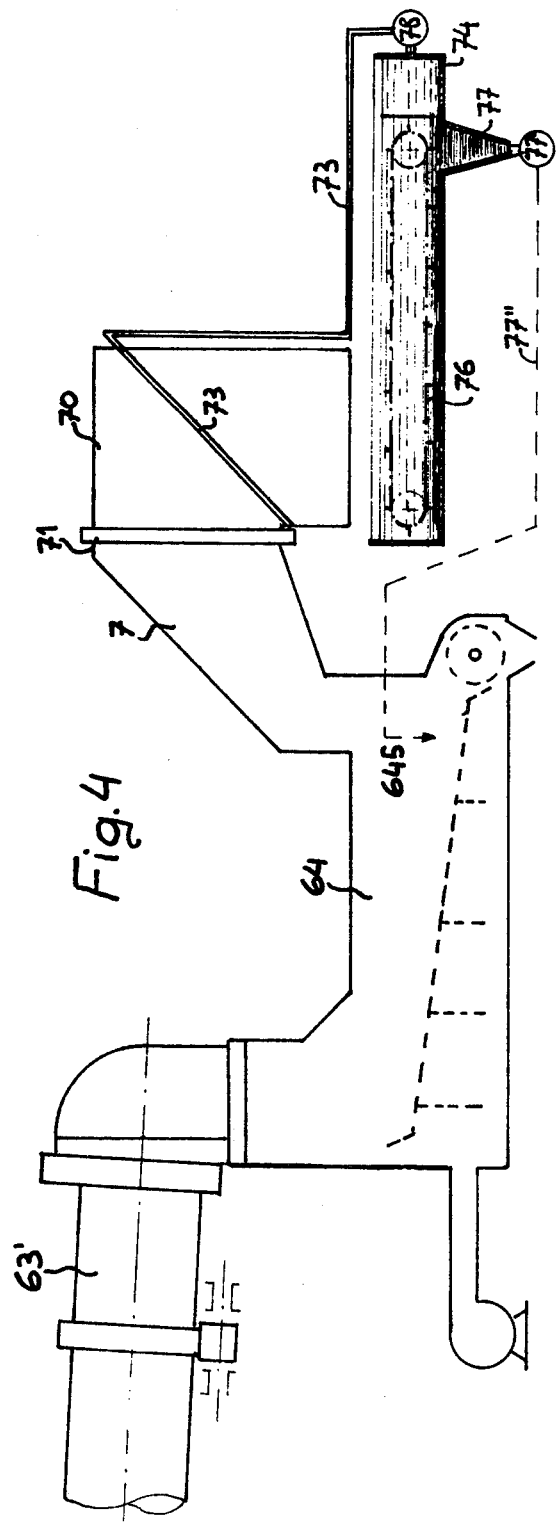
FIG. 4 is a detailed diagram showing dust removal apparatus according to the present invention in position on a cooling site of a cement works in probably the most suitable location.
Figure 5:
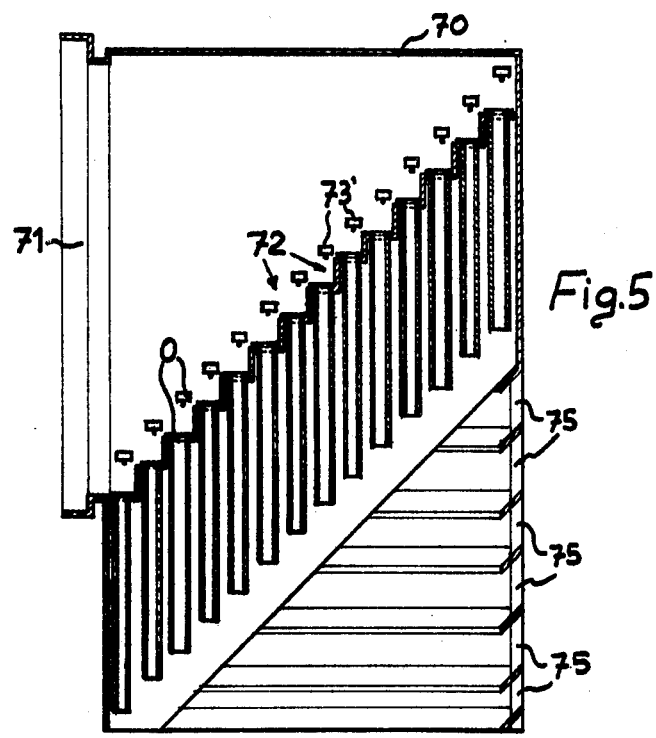
FIG. 5 illustrates, on an enlarged scale, partly in plan view and partly in section, details of a housing body of the plant of FIG. 4, in which a large number of operating units of the dust removal apparatus have been installed.
Figure 6:
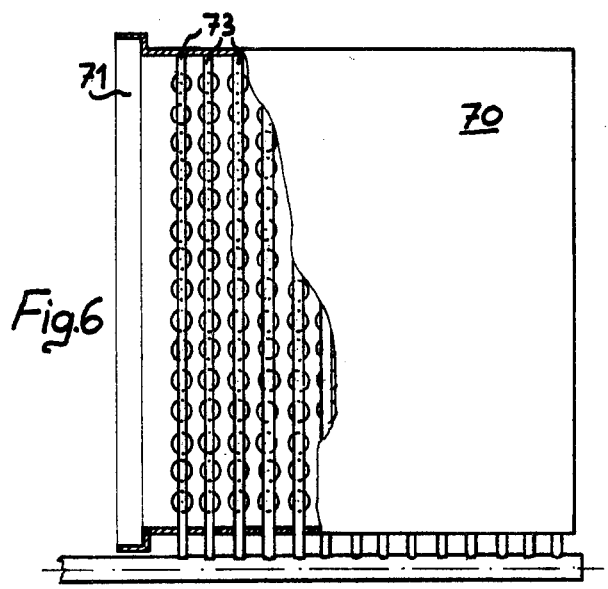
FIG. 6 is a fragmentary plan view of the apparatus shown in FIG. 5.

Referring now to FIGS. 4, 5 and 6 which show apparatus for removing dust from the aeriform substances of the discharge from a cooling site 64 of a cement works with a daily production of about 1,100,000 kilograms of cement per day of eight hours, emitting 210,000 m$^3$/hour at a temperature of about 500° C. with a dust content of 6 g/m$^3$, some of the data relating to the plant and to its operation and an exemplified embodiment of the present invention will now be supplied. The cooling site 64, from which emanates the dusty aeriform substance, is connected by a dust 7 to a chest 70 having substantially the shape of a parallelepiped having a square section, one vertical face of which is situated adjacent the access mouth 71 which faces a staircase 72 of 14 steps. On each footstep of each step 72 there is mounted a battery of 15 operating units O (see FIG. 2). In total therefore, 210 operating units are used, each of which, as can be seen in FIGS. 2, 2A, 2B, consists of five nozzles giving a total of 1050 nozzles in the entire plant. Since the apparatus substantially completely removes the dust from about 210,000 m$^3$ of dusty aeriform substance per hour, it is deduced therefrom that each of the 210 elements or operating units removes the dust from about 1,000 m$^3$ of aeriform substance per hour. The water to the ejectors is carried by a tube 73, which will be described hereinafter, which branches out carrying a branch 73 to each battery of units. The water is taken to the nozzles at a pressure of about 8 atmospheres with a flow of 270 m$^3$/h. From these quantities it is deduced that the mean specific weight $Y_c$ of the frusto-cone 5 is 3.43 kg/m$^3$, which produces a cavitational effect of about 50 mm of $H_2O$, such a cavitational effect being increased, in addition to by the water jet, by the gravitational effect of the water which falls, as well as by the contraction of the absorbed gas which is cooled by the water. The apparatus uses and maintains about 18 m$^3$ of water which is stored in the tank 74 which, in part, is subject to the caisson 70, that is to say to the batteries of ejectors. The mixture of air and water which emerges from the tubes 3 of the operating units separates and the air leaves by the apertures 75 to atmosphere while the water which has now incorporated the dusts falls into the tank 74. Here the dust decants to the bottom of the tank and is transferred by a scraper belt 76 into a small opening 77 where a pump 77', via a tube 77", returns it downstream of the furnace at 645. Above the sludge level in the tank and at the end of the tank 74 remote from the caisson 70, there is provided an intaking mouth of a pump 78 which feeds the tube 73 with water for the operating units. The sludge is pumped away at a rate of about 2,300 kilograms per hour of which about 1300 kilograms can be considered to be dust and 1000 kilograms water. This water, together with that which evaporates, has to be replaced and this requires the order of 5 m$^3$/h to be added. The water circulated stabilises at a temperature of about 45° C.

Apparatus of this kind can be incorporated, without major modifications, into an incineration plant which has a production of dusty hot aeriform substance of the order of that of the cement works just now described.

The foregoing description of a preferred practical embodiment of the invention is illustrative and not limitative of the scope of the inventions and variations may be made thereto within the scope of the following claims.

What is claimed is:

1. Apparatus for the removal of dust from aeriform substances characterized in that in it the removal of the dust takes place by intimate and total mixing of the aeriform substance laden with dust with water and the spontaneous passage of the dust into the water for liberation of the cleansed aeriform substances, the apparatus being characterized in that it comprises a water jet pump means, a housing provided with an aspirating mouth communicating with the aeriform substance from which the dust is to be removed, said aspirating mouth being located adjacent to the pressurized output stream of each water jet pump, at least one decantation tank communicating with the pressurized output stream of said water jet pump, at least one second pump connected at its input to the said decantation tank at a height greater than the sludge/water interface within said tank and at its output to a hydraulic circuit for recycling the water to said water jet pump, and means for removing from the tank the settled sludge and dispatching it for disposal or for recovery, wherein said water jet pump means further comprises a plurality of water jet pumps arranged in several batteries in said housing body, each battery being placed on a footstep of a ladder structure which faces the aspiration mouth communicating with the dust laden aeriform substance so that the direction of the water spray from the jet pumps is substantially vertically downwardly and substantially perpendicular to the direction of flow of the aeriform substance into said housing from said aspirating mouth, said batteries crossing the part of the step perpendicular to the decantation tank for the liquid wherein each battery of water jet pumps impinges upon a separate horizontal strata of the incoming dust laden aeriform substance from the aspirating mouth.

2. An apparatus as claimed in claim 1, wherein each water jet pump comprises a nozzle having a constant cross-sectional channel therethrough from which said pressurized output stream flows and wherein a tube is concentrically aligned with said nozzle such that the end of the tube facing said nozzle receives said pressurized output stream and the aeriform substance to be cleaned.

3. The apparatus as claimed in claim 1 wherein each water jet pump comprises an ejector having a plurality of nozzles arranged in the manner of vertices of a regular polygon, and wherein a tube is concentrically aligned with said ejector such that the end of the tube facing said ejector receives the pressurized output stream from the plurality of nozzles and the aeriform substance to be cleaned.

4. The apparatus as claimed in claim 1 wherein each water jet pump comprises at least one nozzle, said nozzle having a first cylindrical bore throughout its length and a second cylindrical bore concentrically aligned with said first bore with a diameter on the order of five times the diameter of said first bore, and a length substantially equal to the diameter of said first bore; and wherein a tube is concentrically aligned with said ejector, said tube having a diameter substantially twenty-five times larger than the diameter of said first bore and a length equal to about 2.75 times the height of the frusto-conical portion of the pressurized output stream which has as its minor base the section of outlet of the nozzle and as its major base the section of contact of the jet with the tube and extends for 0.75 times such length upstream from said contact surface and for twice such length downstream of said contact surface.

5. The apparatus as claimed in claim 1 wherein each water jet pump comprises an ejector with its axis vertically aligned and the direction of said pressurized output stream is downwards.

* * * * *

UNITED STATES PATENT AND TRADEMARK OFFICE
CERTIFICATE OF CORRECTION

PATENT NO. : 4,149,828
DATED : April 17, 1979
INVENTOR(S) : Ambrogio E. Affri

It is certified that error appears in the above–identified patent and that said Letters Patent are hereby corrected as shown below:

Column 1, line 7, delete "seriform" and insert --aeriform-- therefor;
Column 2, line 58, delete "product" and insert --produce-- therefor.

Signed and Sealed this

Thirteenth Day of January 1981

[SEAL]

Attest:

SIDNEY A. DIAMOND

Attesting Officer

Commissioner of Patents and Trademarks